United States Patent Office 3,241,145
Patented Mar. 15, 1966

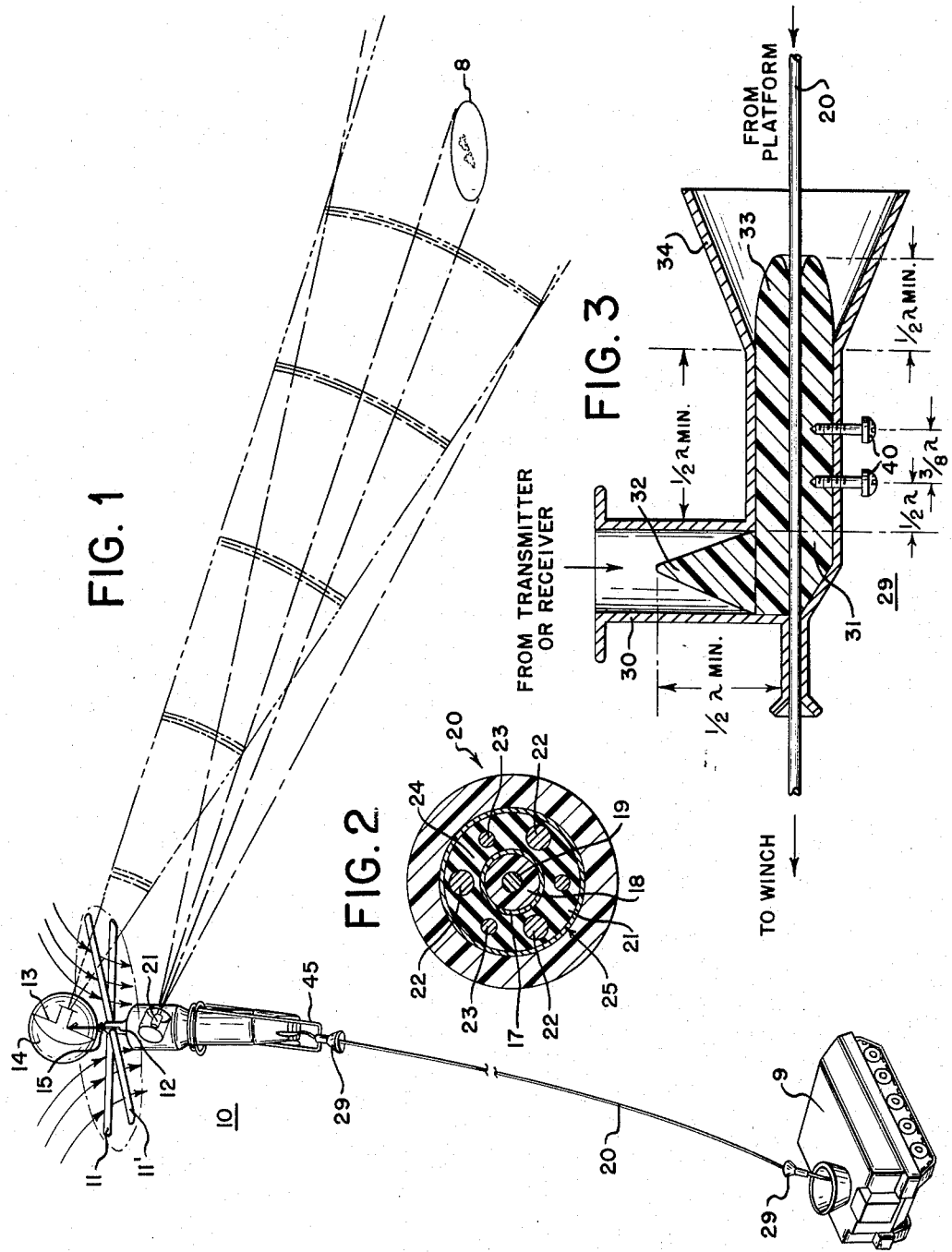

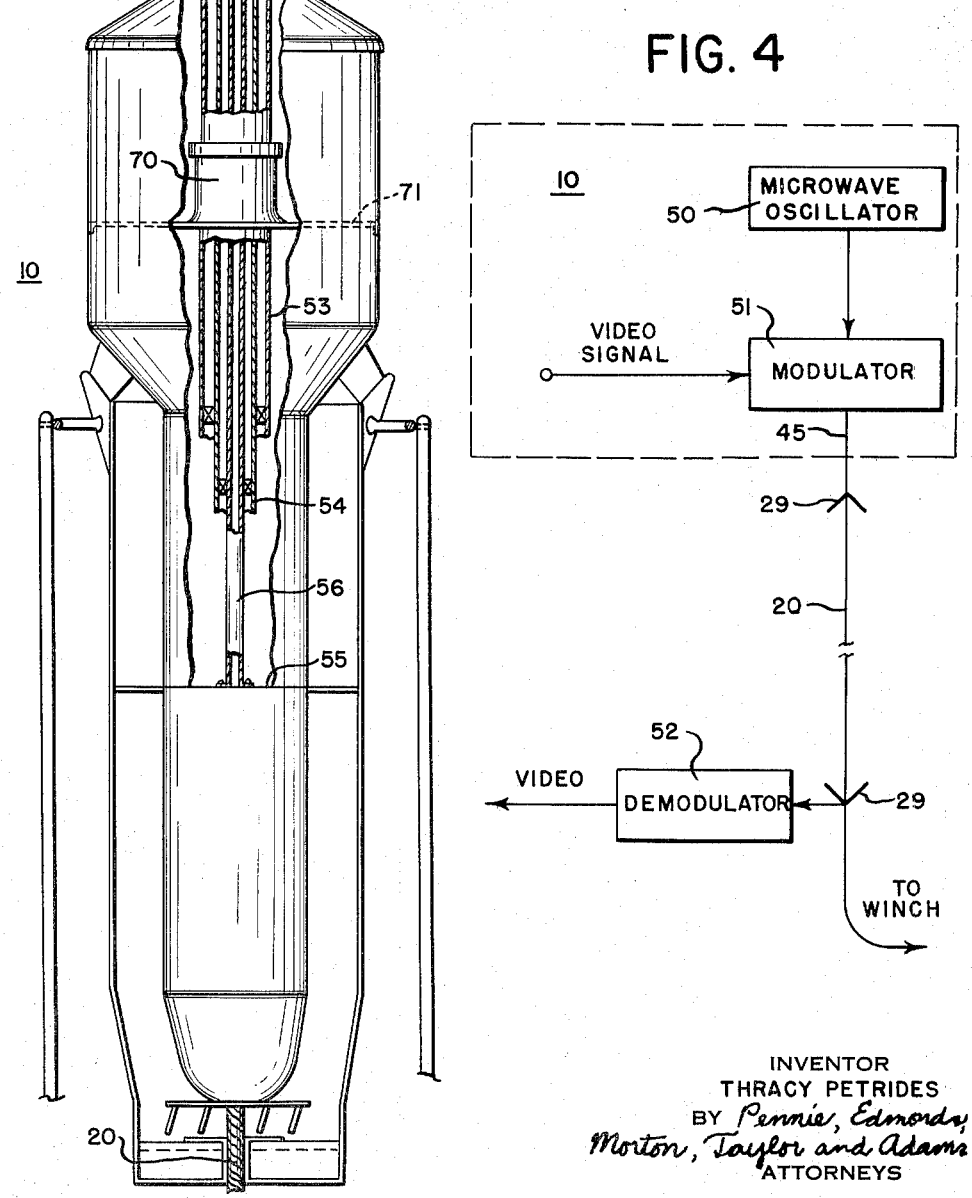

3,241,145
TETHERED HOVERING COMMUNICATION PLATFORM WITH COMPOSITE TETHERING CABLE USED FOR MICROWAVE AND POWER TRANSMISSION
Thracy Petrides, New York, N.Y., assignor to U.S. Industries, Inc., New York, N.Y., a corporation of Delaware
Filed July 3, 1963, Ser. No. 292,666
4 Claims. (Cl. 343—705)

The present invention relates to a tethered hovering platform supported by an electrically driven rotary wing which is energized from a ground based power plant through the tethering cable and, more particularly, to a tethered hovering platform utilizing a composite type tethering cable which is adapted to simultaneously transmit both low frequency drive power and drive control signals and microwave intelligence signals.

Various types of hovering platforms have been proposed in the prior art to provide support means for elevating and extending the range of various types of sensors such as television cameras, infrared sensing devices, microwave receivers and transmitters, radar systems, etc. Elevation of such devices by as much as several thousand feet greatly extends the usable operating range beyond that to which it is normally restricted by curvature of the earth. By increasing the altitude at which microwave equipment may be positioned, for example, the range may be greatly increased while at the same time interfering objects such as hills, buildings and various other types of ground clutter are overcome.

A major difficulty in constructing a hovering platform for supporting communications equipment is that of devising an efficient lift system that will provide a reasonable hovering time while at the same time maintaining an adequate pay load for various sensors and communications equipment supported thereon. In this connection the inventor has found it advantageous to utilize an electrically driven counter rotating blade arrangement, such as that described in pending application Serial No. 125,200 filed July 19, 1961, now Patent No. 3,149,803, by Thracy Petrides et al., wherein the electrical drive motors are energized by electrical conductors disposed in a tethering cable. This type of hovering platform has a significant advantage over those driven by gasoline engines or ram jet motors and the like insofar as the platform may be utilized to support radar antennas, television cameras, infrared sensing devices, etc., for an indefinite period of time.

A further major problem encountered in the operation of hovering communication platforms is that of providing reliable transmission of intelligence information between the ground based equipment and the elevated platform. Waveguides are too rigid and heavy for use with such platforms and small coaxial lines are too lossy for efficient transmission of microwave energy. Intelligence data may be transmitted back and forth between the hovering platform and ground base equipment with a microwave link utilizing highly directional antennas which columnate the microwave energy. Although this arrangement eliminates the use of transmission lines, small positional changes in the hovering platform antenna cause large fluctuations in signal strength and often total loss of signal.

Accordingly, it is a principal object of the present invention to overcome this difficulty of transmitting intelligence information between a tethered hovering communications platform and ground based equipment by providing a composite type tethering cable which is capable of transmitting both the power and control signal information to the platform, as well as intelligence information superimposed on a microwave carrier.

A further object of the invention is to provide a tethered hovering communications platform having a microwave transmitting or receiving antenna which is supported in an electrically and mechanically quiescent position above the driven rotating blades.

In accordance with a featured aspect of the invention, a composite type tethering cable is provided which includes a central core containing power and signal conductors adapted to conduct A.C. or D.C. power and control signals to the motor drive and control mechanisms in the hovering platform, which core is surrounded by a relatively thin mantle of dielectric material to provide a dielectric type waveguide for propagating microwave intelligence carrying signals. Microwave energy is transmitted along the thin mantle of dielectric material surrounding the core of power and signal conductors. Thus it will be seen that applicant has provided a composite microwave and power transmission tether line having substantially the same overall weight and cost as the power cable by itself. Furthermore, experience indicates that the Goubau dielectric type waveguide has extremely high transmission efficiency when operated in free space and without sharp bends in the line.

In accordance with the invention, intelligence modulated microwave signals are launched in the dielectric waveguide surrounding the tether cable by impedance matching sections which include horn type coupling devices. In applications where the intelligence information is in the form of audio or video frequencies, these signals are used to modulate a microwave sub-carrier and the modulated sub-carrier is transmitted via the surface waveguide to the ground base equipment where it is recovered for utilization.

In radar applications, for example, high level modulated signals from a ground based transmitter are transmitted up the dielectric waveguide to the antenna supported on the platform and low level echo return signals from the receiving antenna are transmitted back down the line to the ground based receiver.

In accordance with a further aspect of the invention, a microwave antenna is symmetrically supported in a quiescent space substantially above the axis of rotation for the blades of the hovering platform. The inventor has found that this mounting position provides a receiving and transmitting performance having a minimum disturbance due to modulation of the RF signal by blade rotation. Furthermore, the inventor has found that this axial mounting position is substantially free from mechanical disturbances due to air turbulence.

Referring to the drawings in which a preferred embodiment of the present invention is illustrated:

FIG. 1 is a pictorial view illustrating a hovering communications platform tethered to a mobile ground unit with a composite tether cable constructed in accordance with the present invention;

FIG. 2 is a cross-sectional view of a composite type tether cable provided by the present invention;

FIG. 3 is a cross-sectional view of a microwave coupling device for launching the transmission of microwave energy from a conventional waveguide to a variable length dielectric waveguide as shown in FIG. 2;

FIG. 4 is a simplified block diagram of an intelligence modulated microwave transmission system provided by the invention; and FIG. 5 is an elevation view showing a preferred platform antenna mount.

Referring now to FIG. 1, there is shown an electrically propelled hovering communications platform 10 having a pair of rotating blades 11 rotatably supported at the top of the body in rotor hub 12. In accordance with the invention, microwave dish antenna 13 mounted inside radome 14 is symmetrically supported on rotor hub platform 15 above the axis of rotation for the rotor blades 11. As indicated in the sketch, the antenna radome encounters substantially no disturbance from air turbulence due to the inward and downward flow of air through the rotating blades. Furthermore, the inventor has found that with this antenna location the rotating blades create a very minimum of disturbance to the transmission and reception of the microwave signals.

As described above, electrical power, control signals and microwave transmitter and receiver signals are transmitted to and from platform 10 via tether cable 19.

As illustrated in FIG. 1, the hovering communications platform may be advantageously launched from an armored personnel carrier 9 as used in military operations to extend the intelligence gathering capabilities of such a unit. Platform 10 may support, for example, a high resolution television camera 21, or infrared sensing devices and the like for viewing a remote target area 8. It will be apparent that the elevation of such sensing devices by a matter of several hundred feet greatly extends their operating ranges well beyond the normal ground based line of sight limit. It will also be apparent that the present hovering platform may be used to great advantage in the relay transmission of television programs or in extending the range of weather radar systems and the like.

Referring now to FIG. 2 there is shown in cross-sectional view a composite type tether line 20 which includes a high tensile strength central cable 19 which is preferably copper clad steel surrounded by a jacket 18 of polystyrene or Teflon and a conductive shield 17, which is in turn surrounded by a layer of insulating material 21 (e.g., rubber). Electrical power transmission lines 22 are provided for energizing the electrical drive motors on the platform and a plurality of signal leads 23 are provided for transmitting control signals to the platform navigational control circuits. The insulated power and signal lines are preferably enclosed in a conductive metal shield 25 as shown. A dielectric mantle 21 surrounding the entire surface of cable 20 is provided to function as a Goubau waveguide. The mantle 21 preferably comprises a material having a high dielectric constant such as polystyrene or Teflon. Furthermore, the dielectric constant and the diameter are chosen so that only the $TM_{01}$ mode is propagated. The theory of design for Goubau type dielectric waveguides is well known in the art and will not be discussed herein. Reference should be made to an article entitled "Surface Waves and Their Application to Transmission Lines," by Georg Goubau appearing in Journal of Applied Physics, vol. 21, No. 11, November 1950.

In operation, radiation losses are maintained at a very low level by avoiding small radius bends in the tether cable and by elevating the hovering platform in a locale where coupling to adjacent objects such as buildings, steel towers, trees and the like is a minimum. It is apparent to those skilled in the art that this coupling is minimized by providing proper clearance between the tether line and such objects. It will be recognized that applicant's composite cable provides a strong, compact and efficient means for simultaneously transmitting microwave signals, low frequency A.C. drive power and D.C. control signals. At the same time the shielded copper-clad steel core may be effectively utilized as a coaxial cable to transmit video signals from the platform to ground base equipment.

Referring now to FIG. 3, there is shown in sectional view a preferred embodiment of a coupler device 29 for coupling microwave energy from a radar transmitter or receiver to the surface dielectric waveguide on cable 20. Such a coupling means may be utilized at either the ground base end of the tether line or at the platform end of the tether line as illustrated. Microwave energy from a ground based transmitter or from a platform supported antenna is connected to waveguide 30 which includes a dielectric core 31 made from a high dielectric material such as Teflon and having a central core adapted to receive and slidably pass therethrough the tether cable 20 as illustrated. The Teflon core includes tapered impedance-matching end sections 32 and 33 as shown, each of which is at least one-half wavelength in length at the operating frequency. The coupling device also includes an impedance-matching horn 34 through which the tether cable passes. At the ground base installation, the cable emerging from the left-hand end of the coupling device is extended to a suitable power winch (not illustrated), and leads 22 and 23 are attached to suitable electrical connectors. At the platform end, the cable extends to a suitable anchoring clamp and the power and signal cables are connected to power terminals and signal control terminals for the drive motor and attitude control apparatus, respectively. Tuning screws 40 are provided to afford optimum impedance-matching (minimum standing wave ratio) between the conventional waveguide input and the dielectric waveguide on the outer surface of the tether cable.

At the platform, the horn-type impedance-matching coupler shown in FIG. 3 is preferably supported on a yoke which is pivotally attached near the center of the cylindrical platform body as shown. Low level microwave energy either from the radar receiving dish antenna 13 or from a low level signal-modulated microwave carrier generator is coupled to the dielectric waveguide by a relatively short length of coaxial cable 45. The tether cable is then allowed to pass on through the horn-type coupling device and extend on into the bottom part of the cylindrical body as shown.

As indicated above, in applications utilizing platform sensors which produce relatively low frequency output signals, these signals are advantageously superimposed on a microwave carrier signal for transmission via the dielectric waveguide on the surface of tether cable 20. A microwave carrier signal (e.g., X band) from oscillator 50 (see FIG. 4) is modulated with a video signal from television camera 21 by modulator 51 and the modulated output signal is coupled to variable length tether cable 20 by coupler 29. The video modulated carrier is removed from 20 at the ground base station by coupler 29 and demodulated by demodulator 52 as shown.

The drive and stabilizing control members for the platform are preferably of the type described in pending application Ser. No. 125,200 filed July 19, 1961 by Thracy Petrides et al. and entitled Tethered Hovering Platform. Accordingly, the structural details of the motor drive, etc. will not be described herein except to point out certain modification in the counter-rotating coaxial drive shafts 53 and 54 for the lifting blades 11 and 11', respectively (FIG. 5). In accordance with the present invention a central rigid spine 56 is disposed inside the counter-rotating coaxial drive shafts 53 and 54. Spine member 56 is rigidly anchored to frame member 55 and extends upwardly through the center of shaft 54 and out through the top of hub 12. Platform flange 15 is provided to rigidly support antenna 13 above the rotating blades 11 and 11' as shown in FIG. 1. Shaft 53 is supported by a main external bearing 70 which is anchored to body member 71 as illustrated.

A preferred embodiment of the invention has been described and illustrated. It will be apparent to those skilled in the art that various modifications and changes may be made within the scope of the invention as defined in the appended claims. What is claimed is:

1. A tethered rotary wing hovering platform comprising a body member with lifting blades rotatably supported thereon, electric drive motor means for rotating said blades,
    antenna means supported on said body for the reception and transmission of microwave radio signals, a variable length composite tether cable connected to said body member and adapted to transmit electrical power from a ground base supply to energize said drive motor and to transmit microwave radio signals between a ground base microwave station and said antenna, said tether cable having a central core containing electrical conductors for transmitting electrical power to said drive motor and an outer sheath of dielectric material provided to transmit microwave signals between said station and said antenna, and means for continuously coupling microwave signals transmitted along the surface of said variable length tether cable to said ground base station.

2. A hovering platform in accordance with claim 1 characterized in that the electrical conductors in the central core of the composite tether cable are enclosed in an electrically conductive sheath.

3. A tethered rotary wing hovering platform comprising a body member with lifting blades rotatably supported thereon, electric drive motor means for rotating said blades, an intelligence-modulated microwave signal generator supported by said body, a variable length tether cable connected to said body member and adapted to transmit electrical power from a ground base supply to energize said drive motor and to transmit microwave radio signals from said intelligence-modulated microwave signal generator to said ground base station, said tether cable having a central core containing electrical conductors for transmitting electrical power to said drive motor and an outer sheath of dielectric material provided to transmit microwave signals from said intelligence-modulated microwave signal generator to said ground base station, and means for continuously coupling microwave signals transmitted along the surface of said variable length tether cable to said ground base station.

4. A tethered rotary wing hovering platform comprising a body member with lifting blades rotatably supported thereon, electric drive motor means for rotating said blades, a microwave antenna provided to transmit and receive microwave radio signals while supported by said hovering platform, means for symmetrically supporting said antenna in a quiescent space substantially above the axis of rotation for said blades.

a variable length composite tether cable connected to said body member and adapted to transmit electrical power from a ground base supply to energize said drive motor and to transmit microwave radio signals between a ground base microwave station and said antenna, said tether cable having a central core containing electrical conductors for transmitting electrical power to said drive motor and an outer sheath of dielectric material provided to transmit microwave signals between said station and said antenna, and means for continuously coupling microwave signals transmitted along the surface of said variable length tether cable to said ground base station.

References Cited by the Examiner
UNITED STATES PATENTS

| | | | |
|---|---|---|---|
| 2,433,344 | 12/1947 | Crosby | 343—706 |
| 2,862,680 | 12/1958 | Berger | 244—17.17 |
| 2,995,740 | 8/1961 | Shreckengost | 343—705 |

FOREIGN PATENTS

| | | |
|---|---|---|
| 897,756 | 7/1958 | Great Britain. |

HERMAN KARL SAALBACH, *Primary Examiner.*